Patented Apr. 19, 1949

2,467,526

UNITED STATES PATENT OFFICE 2,467,526

CURING OF COPOLYMERS

Raymond R. Harris, Stamford, Conn., assignor to American Cyanamid Company, New York, N. Y., a corporation of Maine No Drawing. Application October 10, 1944, Serial No. 558,086

5 Claims. (Cl. 260—45.4)

This invention relates to the activation of catalysts for the copolymerization of an unsaturated alkyd resin with a compound containing the

group.

An object of this invention is to increase the speed of copolymerization between an unsaturated alkyd resin and a substance containing the

group such as for example styrene.

Another object of this invention is to provide fast-setting casting resins.

These and other objects are attained by copolymerizing an unsaturated alkyd resin with a substance containing the

group in the presence of an organic peroxide and a polyvalent metal in a reduced form as compared to its most oxidized form such as iron or a ferrous salt which may be an inorganic salt, e. g., ferrous chloride, or an organic salt e. g., the salt obtained by reacting the half ester of diethylene glycol and maleic acid and powdered iron at about 130-150° C. The proportion of polyvalent metal, such as iron, may be varied widely but, with the proportion of peroxide catalyst ordinarily used, from 0.005% to 0.1% is suitable, although it is preferable that at least 0.02% of the polyvalent metal be used to obtain excellent results. However, should it be desirable to increase the time required for gelation or curing in certain processes, the concentrations of polyvalent metal may be less than 0.02%. The proportion of polyvalent metal should, in general, be based upon the proportion of organic peroxide catalyst employed. It is preferable that the weight ratio of the peroxide to the polyvalent metal or salt thereof be between about 25:1 and 2:1 based on the metal. It has been found that the proportion of peroxide may be varied over relatively wide ranges e. g., from about 0.1% to about 5%. In many applications large amounts of peroxide are undesirable either because of the very high speed of reaction or because of the effect on the final product. It is therefore preferable for most purposes that the proportion of peroxide be between about 0.1% and 0.5 %.

The following examples in which the proportions are in parts by weight are given by way of illustration and not in limitation.

Preparation of ferrous salt of diethylene glycol monomaleate

About 1 mol of diethylene glycol and 1 mol of maleic anhydride are heated at about 130-150° C. to form the half ester. From 2 to 5% of powdered iron is added to the half ester at a temperature of about 150° C. to form a ferrous salt of diethylene glycol monomaleate.

Example 1

About 1 part of styrene is intimately mixed with 2 parts of an unsaturated alkyd resin, a polyester of 6 mols of diethylene glycol, 5 mols of fumaric acid and 1 mol of sebacic acid, to form a homogeneous mixture. To this mixture is added 0.5% of the iron salt prepared above, which is equivalent to about 0.06% Fe, as a 40% aqueous solution and thoroughly stirred. Upon addition of 0.5% of lauric peroxide a gel results in about 1 minute at about 25° C.

Example 2

The procedure in Example 1 is followed with the exception that 0.4% of the iron salt and 0.2% of lauric peroxide are employed. A gel results in 6 minutes at a temperature of 25° C.

Example 3

Example 1 is followed except that 0.2% of the iron salt and 0.2% of lauric peroxide is used. A gel results in about 45-60 minutes at a temperature of 25° C.

Example 4

Example 2 is repeated with the substitution of 0.2% of benzoyl peroxide for the lauric peroxide. A gel is obtained in 8-10 minutes at 25° C.

Example 5

The procedure in Example 2 is followed with the exception that 0.2% of benzoyl peroxide is used in place of the lauric peroxide. A gel is obtained in about 45-60 minutes at 25° C.

Example 6

Example 1 is followed with the exception that 0.2% of lauric peroxide and 0.25% of the iron salt dissolved in ethylene glycol are used. A gel results in 3 to 5 minutes at a temperature of 25° C.

Example 7

About 1 part of styrene is intimately mixed with 2 parts of an alkyd resin (a diethylene glycol fumarate modified with sebacic acid as described in Example 1) to form a homogeneous mixture.

0.05% lauric peroxide is incorporated in the mixture and 0.021% of Fe, as FeCl₃ dissolved in ethylene glycol, is added at about 25° C. The mixture gels in about 1 minute at 25° C. and is fully cured after about 60 minutes.

Example 8

Example 7 is repeated except that the iron concentration is lowered to 0.01%. This gels in 45 minutes at 25° C. and cures in 135 minutes at the same temperature.

Example 9

Example 7 is repeated with the exception that 0.005% of iron is employed. This results in a gel in 3 hours at a temperature of 25° C. and is fully cured in 24 hours.

It is known that inorganic salts such as ferric chloride or stannic chloride have found use as polymerization catalysts by themselves. As a result of experimentation it was found that the ferric salts, used in the same concentrations as the ferrous salts, showed no activating properties when used with organic peroxide catalysts. Surprisingly, the use of small concentrations of polyvalent metal salts such as the stannous salts and ferrous salts with organic peroxide catalysts did give unexpected results in the acceleration of the copolymerization of an unsaturated alkyd resin with a substance containing the

group.

Any of the polyvalent metals or salts thereof where the metal is in a reduced form as compared to its most oxidized state may be used in accordance with my invention. Preferably salts of the polyvalent metals are used and they are desirably introduced into the copolymerizable mixtures in the form of solutions in organic solvents such as, ethylene glycol, diethylene glycol, acetone, dioxane, etc. The salts may be anhydrous or hydrated such as SnCl₂2H₂O.

It will be apparent from a consideration of my examples that I am able to obtain fast curing compositions which may be cast at ordinary room temperatures. Previously it has been customary to employ much higher temperatures for curing resins of the type employed herein in order to obtain cured products quickly. My invention therefore makes it possible to produce castings or other articles without the use of expensive ovens or other means of supplying heat to the polymerizing compositions while they are being cured. Furthermore at relatively high temperatures large castings or laminates, that is those with thick sections often crack or blister whereas when low curing temperatures are employed flawless products are obtained. Here again my invention overcomes this difficulty since at the low temperatures which may be used in accordance with my invention thick articles may be produced satisfactorily.

My invention is particularly adapted for use in the production of castings but it may also be used in the production of laminated materials, moldings, etc. One advantageous application of my invention is in the use of my resin mixtures containing a polyvalent metal to impregnate cloth to be used in laminating. The polyvalent metal causes the resin to set and the impregnated cloth may then be drawn in forming a laminate in a complex shape. After the laminate is formed the resin is preferably fully cured by heating at elevated temperatures of 70–110° C.

Coatings of my resinous mixtures containing a polyvalent metal may be gelled thereby so that pressure and heat may be applied to cure the resinous coating and the latter does not squeeze out but has sufficient body that a film of substantial thickness remains in place.

Temperatures of 20–30° C. are satisfactory for curing castings or thick articles when a polyvalent metal is used in accordance with my invention. However, if desired, higher or lower temperatures may be employed and in order to obtain fast curing of thin articles higher temperatures are desirable.

Examples of substances containing a polymerizable

group which may be copolymerized with an unsaturated alkyd resin in accordance with my invention are: styrene, o-methyl styrene, m-methyl styrene, or p-methyl styrene, the monochlor or dichlor styrenes, dimethyl styrenes, vinyl acetate, methyl methacrylate, methyl acrylate, allyl acetate, diallyl phthalate, diallyl fumarate, diallyl maleate, diallyl sebacate, diallyl succinate, triallyl phosphate, triallyl tricarballylate, the diallyl ester of ammelide, etc. The polyallyl esters are especially suitable for copolymerization with unsaturated alkyd resins but other allyl compounds may be employed such as diallyl ether.

The substances containing the

group which are particularly useful in my invention are those which have a boiling point of at least 60° C. and are therefore normally liquid. Furthermore, these substances do not contain conjugated carbon-to-carbon double bonds since these compounds are known to react with themselves or with other compounds such as maleic esters by a 1,2–1,4 addition mechanism commonly known as the Diels-Alder reaction.

On the other hand compounds such as those used in accordance with the present invention and which contain no conjugated carbon-to-carbon double bonds obviously cannot undergo this type of reaction with the maleic esters. Accordingly, my invention is not directed to the use of unsaturated compounds containing conjugated systems of carbon-to-carbon double bonds. Many substances which contain carbon-to-carbon double bonds conjugated with respect to oxygen are suitable for use according to this invention since they do not react with unsaturated alkyd resins in an undesirable manner but instead copolymerize or interpolymerize to form substantially insoluble resins.

The unsaturated alkyd resins which are suitable for use in accordance with my invention are those which are polyesters of an alpha, beta unsaturated polycarboxylic acid and a polyhydric alcohol. The unsaturated alkyd resins may be modified with monohydric alcohols or monocarboxylic acids. However, the proportions of the various substances esterified to form the resin are such that the polyester is formed from substances having a total of about one hydroxyl group for each carboxyl group.

Among the alpha, beta unsaturated polycarboxylic acids which may be used some examples are maleic acid, fumaric acid, itaconic acid, citraconic acid, etc. Mixtures of alpha, beta polycarboxylic acids may be used, and mixtures of polycarboxylic acids including one or more alpha, beta unsaturated polycarboxylic acids and a saturated aliphatic polycarboxylic acid or an aromatic polycarboxylic acid may be employed. In some cases, particularly when the unsaturated alkyd resin is to be used for copolymerization with styrene or other aromatic vinyl hydrocarbons it is desirable that the unsaturated alkyd resin contain a small proportion of a relatively long chain polycarboxylic acid such as adipic acid or sebacic acid, or of an aromatic polycarboxylic acid such as phthalic acid or endomethylene tetrahydrophthalic anhydride.

The term "acid" as used herein, is intended to cover the anhydride as well as the acid since the anhydride may be used whenever available and desirable.

The unsaturated alkyd resins are preferably polyesters of glycols, but other polyhydric alcohols including glycerine, pentaerythritol, dipentaerythritol, polyallyl alcohol etc., may be used. Examples of glycols which may be employed are ethylene glycol, diethylene glycol, trimethylene glycol, alpha-propylene glycol, any of the butylene glycols, decamethylene glycol, octadecandiol etc.

Among the monocarboxylic acids which may be employed as modifiers some examples are acetic acid, caproic acid, lauric acid, myristic acid, stearic acid, oleic acid, linoleic acid, linolenic acid etc. Some examples of the monohydric alcohols which may be used as modifiers are n-butanol, propanol, isopropanol, the amyl alcohols, cyclohexanol, 2-ethyl hexanol, dodecanol, cetyl alcohol, octadecanol, benzyl alcohol, furfuryl alcohol and tetrahydroabietyl alcohol, etc.

When glycols are reacted with a dicarboxylic acid it is preferable that the glycol be present in a molal ratio to the acid of not less than 1:2 and the molal ratio of monohydric alcohol to dicarboxylic acid not greater than 1:1. In most cases the molal ratio of monohydric alcohol to dicarboxylic acid of about 1:6 produces the best results (5.5 mols of glycol being employed in this case). The proportion of monocarboxylic acid which may be used should similarly be less than 1:2 in most instances. If a dicarboxylic acid which does not contain an alpha, beta unsaturation is used to modify the unsaturated alkyd resins it is preferable that the molal ratio thereof to the alpha, beta unsaturated polycarboxylic acid be less than about 1:2 and preferable that the ratio be about 1:5.

The unsaturated alkyd resins are produced in accordance with technique well known in the alkyd resin art. The final product should preferably have an acid number not greater than 50, although in some cases resins having an acid number as high as 100 may be desirable.

Some of the peroxides which may be employed as catalysts in accordance with the present invention in conjunction with the polyvalent metal such as a ferrous salt are: benzoyl peroxide, phthalic peroxide, succinic peroxide, benzoyl acetic peroxide, fatty oil acid peroxides, alcohol peroxides e. g. tertiary butyl hydroperoxide and terpene oxides. The accelerative effect of the polyvalent metal or salt thereof is more pronounced with the oil acid peroxides and with benzoyl acetic peroxide.

Moldings or castings produced in accordance with my invention may have suitable filler, dye or pigment incorporated therein, including for example alpha cellulose pulp, wood flour, glass fibers, asbestos fibers, titanium oxide etc. Laminated materials may be prepared utilizing the resins disclosed herein and catalyzed by my method, and such laminated materials may contain paper or fabric composed of cellulose fibers, glass fibers, asbestos fibers, synthetic fibers etc.

In my copending application Serial No. 558,087, filed Oct. 10, 1944 entitled "Acceleration of the cure of copolymers" I have described and claimed the use of stannous salts for the accelerating or modifying the cure of copolymerizable mixtures as described herein.

Obviously many modifications and variations may be made in the compositions and processes described herein without departing from the spirit and scope of the invention as defined in the appended claims.

I claim:

1. A process which comprises copolymerizing in bulk a homogeneous mixture including a polymerizable liquid substance containing the

group which has no carbon-to-carbon conjugation, an unsaturated alkyd resin obtained by esterifying a mixture including a polyhydric alcohol and an alpha, beta-unsaturated polycarboxylic acid and about 0.1–5% of an organic peroxide catalyst in the presence of a ferrous salt selected from the group consisting of ferrous chloride and the ferrous salt of diethylene glycol monomaleate, the weight ratio of the peroxide to the ferrous salt being between about 25:1 and 2:1 (based on the metal), said ferrous salt being the sole activator of said peroxide catalyst present in said homogeneous mixture.

2. A process as in claim 1 wherein the ferrous salt is ferrous chloride, and wherein the temperature of polymerization is about 20–30° C.

3. A process as in claim 1 wherein the ferrous salt is ferrous chloride.

4. A process as in claim 1 wherein the ferrous salt is the ferrous salt of diethylene glycol monomaleate.

5. A process as in claim 1 wherein the polymerizable liquid substance is styrene.

RAYMOND R. HARRIS.

REFERENCES CITED

The following references are of record in the file of this patent:

UNITED STATES PATENTS

| Number | Name | Date |
|--------|------|------|
| 2,305,224 | Patterson | Dec. 15, 1942 |
| 2,344,875 | Owens et al. | Mar. 21, 1944 |
| 2,370,010 | Clifford et al. | Feb. 20, 1945 |
| 2,380,473 | Stewart (1) | July 31, 1945 |
| 2,380,474 | Stewart (2) | July 31, 1945 |